July 16, 1929.  J. I. HAASE  1,721,298
TIRE TRIMMING MACHINE
Filed Nov. 19, 1925   2 Sheets-Sheet 2
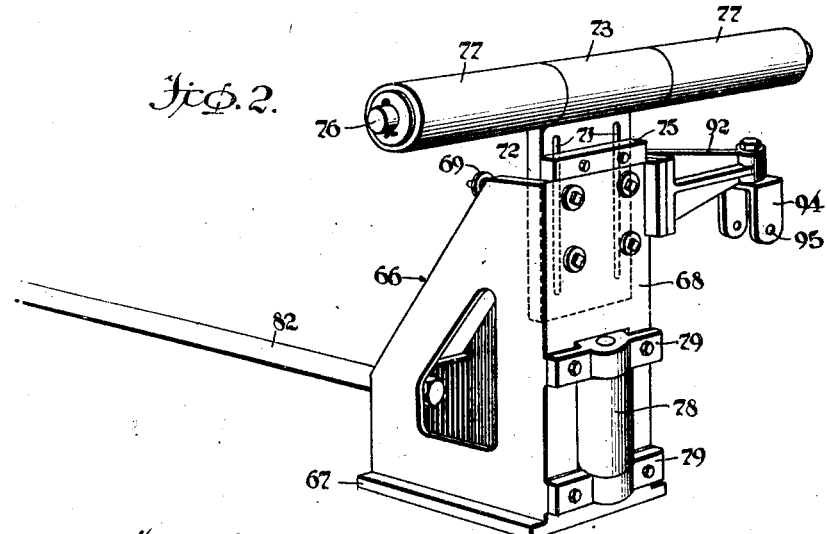
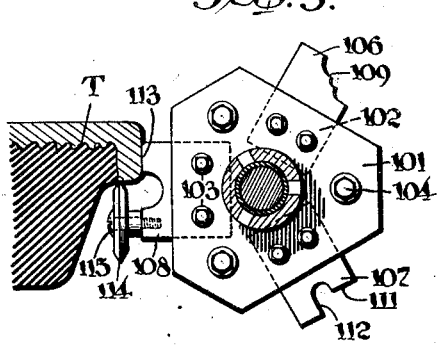
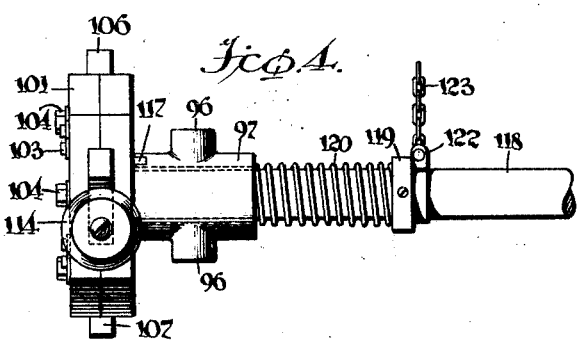
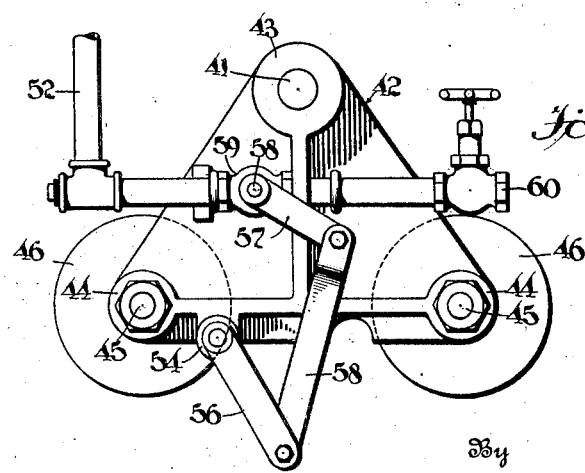
Inventor
Jorgen I. Haase,
By O. E. Bee.
Attorney Patented July 16, 1929.

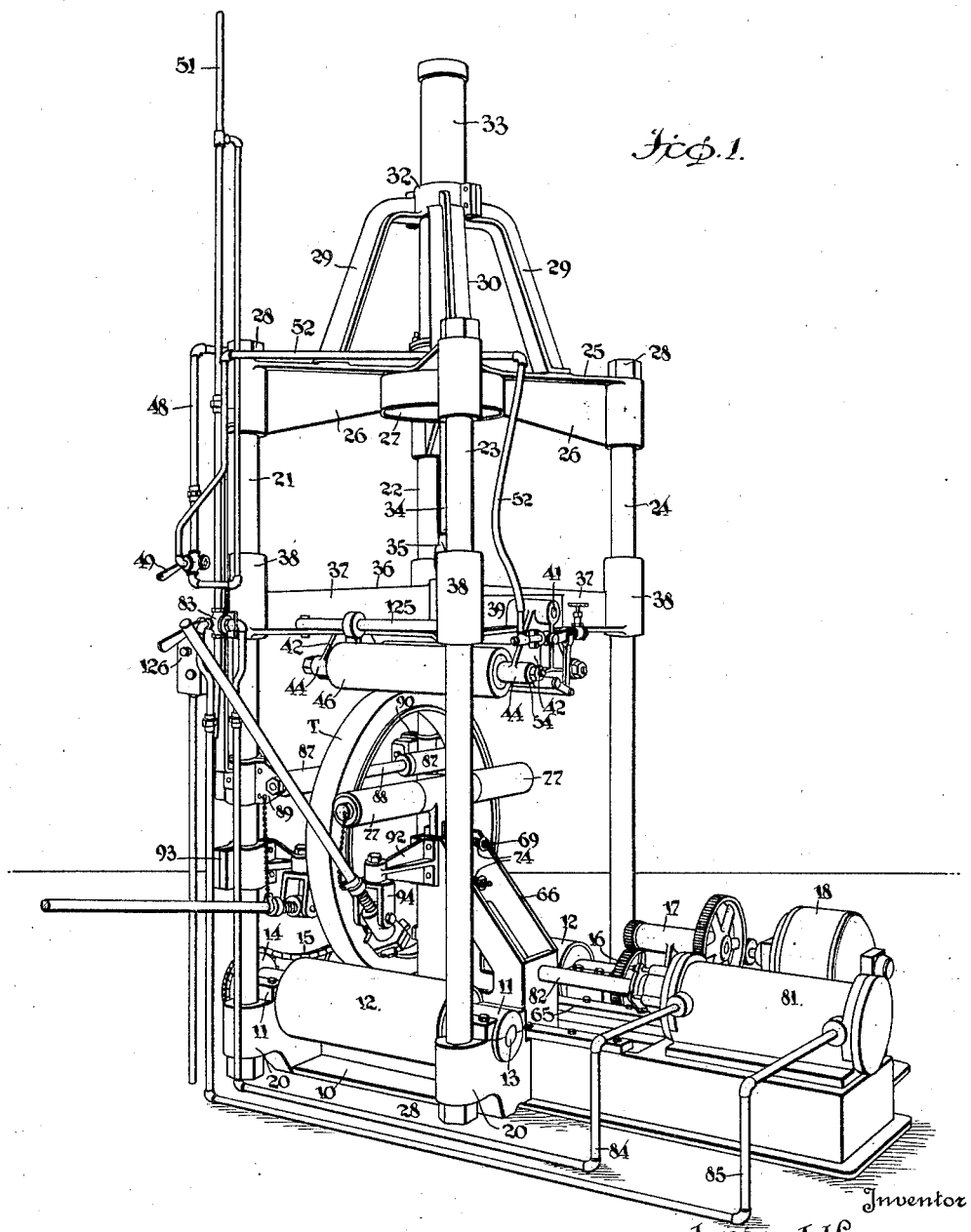

1,721,298

UNITED STATES PATENT OFFICE.

JORGEN I. HAASE, OF AKRON, OHIO, ASSIGNOR TO THE GOODYEAR TIRE & RUBBER COMPANY, OF AKRON, OHIO, A CORPORATION OF OHIO.

TIRE-TRIMMING MACHINE.

Application filed November 19, 1925. Serial No. 70,116.

My invention relates to tire trimming machines and it has particular reference to a machine adapted to remove excess rubber from the base band of a solid or cushion tire.

It is customary in manufacturing tires of the above designated character to vulcanize the rubber tread portion upon a metal rim, while the parts are maintained in assembled relation in a mold designed for this purpose. During vulcanization, excess rubber creeps out of the mold adjacent the rim and it is removed before marketing the tire to render the article more saleable by reason of its improved appearance. Heretofore, the trimming operation has been performed manually.

The object of the invention is to provide a machine by means of which excess rubber, or overflow, may be readily removed from the vulcanized tire. In the preferred embodiment of the invention described herein, the tire is rotatably mounted and is held in definite relation to cutting elements which are impressed upon the surface of the tire to remove the excess rubber.

In the drawings:

Fig. 1 is a perspective view of the machine with a tire mounted thereon;

Fig. 2 is a perspective view of one unit of the machine drawn on a larger scale;

Fig. 3 is a detail view in end elevation of a cutting tool;

Fig. 4 is a plan view thereof; and

Fig. 5 is a detailed view in end elevation of a throttle mechanism.

The machine comprises a bed frame 10 having journal boxes 11 formed thereon which are adapted to rotatably support two rollers 12. The trunnions 13 of the rollers 12 project beyond the bearings 11 on one side of the machine and have keyed thereto sprocket wheels 14 which are interconnected by a suitable drive, such as a chain 15. One of the trunnions 13 is provided at the opposite side of the frame with a projecting portion to which is secured a gear wheel 16, that engages a suitable train of driving mechanism, indicated generally by the reference numeral 17, which is connected to a suitable source of power, such as a motor 18, to provide a means for positively rotating the rollers 12.

Bosses 20 are provided at each corner of the frame 10 adjacent the journal boxes 11 and are adapted to receive upright circular posts 21, 22, 23 and 24, which are interconnected at their upper extremities by a spider 25 having four arms 26 which project radially from a circular hub portion 27, whereby to form a supporting frame. The posts are suitably threaded and shouldered to permit of rigid assembly of the associated parts by means of nuts 28. The upper face of the spider 25 is machined to provide bearing seats for the legs 29 of a support 30, which converge upwardly and merge into a split collar 32 in which is clamped a cylinder 33, extending downwardly to the hub portion 27 of the spider 25.

A piston rod 34 of the cylinder 33 extends through an aperture formed in the hub 27 and is connected at its outer end by means of a swivel 35 to a slide, indicated generally by the reference character 36. Four arms 37 extend outwardly from the central portion of the slide 36 and merge into sleeves 38 which surround the posts 21, 22, 23 and 24. Extending between adjacent pairs of the arms 37 on opposite sides of the machine are bridges 39 which have secured thereto axles 41 upon which are pivotally mounted triangular frames 42. As best shown in Fig. 5, each frame 42 is provided at its upper apex with a boss 43 which provides a bearing for the axle 41 and at its lower apices with portions 44 adapted to receive fixed rods 45, upon which are rotatably mounted two idle rollers 46.

It is to be understood that the cylinder 33 is adapted to receive a suitable fluid, such as compressed air, which may be employed to raise or to lower the slide 36 together with the rollers 46 mounted thereon. Preferably, air is admitted from the underside of the cylinder 33 through a conduit 48, which extends from a control valve 49, suitably connected by a pipe line 51 to a high pressure reservoir, not shown. The air supporting the piston within the cylinder and the slide 36 is permitted to escape through a conduit 52 when it is desired to lower the slide 36, which descends therefore solely through the force exerted by its own weight. It is apparent that the weight of the parts forming the slide 36 will impart to it considerable momentum, which might reach a value sufficient to damage the machine or the tire T when the rollers 46 come into contact with the periphery thereof. Accordingly, a throttle mechanism is provided which is adapted to prevent the rapid escape of air through the pipe 52 as the rollers 46 approach the tire, and, hence, so retard the descent that the rollers and tire contact with each other gradually, and without sufficient impact to develop excessive strains within the machine.

The mechanism for accomplishing this result comprises a rod 54, which is pivotally supported from a link 56, which in turn is pivoted to a link 57 by a link 58. The link 57 is secured to the valve stem 58 of a valve 59, interposed in the discharge conduit 52 between the outer aperture 60 thereof and the cylinder 33. When the slide 36 is elevated above the surface of the tire T, the rod 54 is disposed below the lower edge of the rollers 46, by virtue of its own weight and hence, as the slide 36 is lowered, the rod 54 first contacts with the tire. As the rod moves upwardly relatively to the rollers 46, upon initial contact with the tire, the links 56, 58 and 57 are actuated to partially close the valve 59 and hence reduce the rate of escape of the compressed air from the cylinder 33. A throttling effect is thereby produced which maintains a sufficient pressure within the cylinder 33 to retard the rate of descent of the slide 36 and hence allow the rollers 46 to come into gradual contact with the tire T and thereby avoid the development of destructive stresses. The pivotal suspension of the rollers 46 upon the slide 36 also permits an automatic adjustment of the two rollers to contact properly with the periphery of the tire.

The inner portion of the frame 10 between the supporting rollers 12 is recessed to provide a track 65 for a member 66 slidably mounted therein and having elements mounted thereon which cooperate with the rollers 12 and 46 to position and guide the tire T. As best shown in Fig. 2, the member 66 comprises a substantially rectangular hollow frame provided at its lower portions with flanges 67, which are adapted to engage the track 65 formed in the frame. A plurality of bolts 69 are disposed in the frame 68 and, in slots 71 formed in a depending portion 72 of a bearing 73. Coiled springs 74 are interposed between the depending portion 72 and the extremities of the bolts, and thus provide a means for resiliently mounting the bearing 73 upon the member 66. A stop plate 75 overhanging the upper edge of the face 68 may also be secured to the portion 72 to provide means to limit the downward displacement of the bearing 73.

A shaft 76 extending through the bearing 73 has mounted on it two idle rollers 77 which are adapted to contact with the surface of the tire, in a manner which will be explained presently. A third idle roller 78 may also be positioned upon the face 68 of the member 66 through the medium of bearing blocks 79. Preferably the axis of the roller 78 is at right angles to the axis of the roller 77 and the extreme inner traces of all three rollers lie in the same plane.

A pump or compressed air cylinder 81 is mounted upon the extremity of the frame 10 and is provided with a piston rod 82 which is secured to the outer face of the member 66. Compressed air may be introduced on either side of the piston within the cylinder 81 for the purpose of moving the member 66 with its associated parts toward or away from the tire. The actuating fluid may be introduced from the compressed air line 51 and may be distributed through a suitably disposed valve 83 and pipe lines 84 and 85.

A plurality of fixed idle rollers 87, oppositely disposed to the idle rollers secured on the member 66, are provided on the frame 10 and the upright posts 21 and 22, as shown in Fig. 1. The rollers 87 are preferably mounted upon a fixed axle 88 which is secured between the posts 21 and 22 by means of two brackets 89 and 90. A third fixed roller, not shown, may also be provided in a suitably mounted bearing positioned within the frame of the machine and aligned with the roller 78 mounted upon the member 66. All the rollers employed for the purpose of supporting and positioning the tire within the machine may be of any desired construction, but it is preferred to cover them with a thin layer of rubber in order to reduce the possibility of damage to the tire, and to provide a certain degree of resiliency in their contact therewith.

Two similarly constructed trimming units are assembled upon the machine, one unit being mounted preferably upon a bracket 92 secured to the member 66, and the other upon a bracket 93 which may be positioned upon the post 21. Each bracket has a U-shaped arm 94 swivelly mounted at the outer end thereof. Pins project through apertures 95 in the tines of the arms 94 and into recesses 96 which are formed in a tool supporting sleeve 97. As best shown in Figs. 3 and 4, the tool comprises a hexagonally shaped head 101, three faces of which are provided with rectangular slots 102, adapted to receive knives which may be secured therein by suitable means, such as set screws or bolts 103. For convenience in assembly, the head may be made in two parts which are secured together by bolts 104.

The knives 106, 107 and 108 may be made from ordinary tool steel and may be provided with various types of contours which are adapted for special purposes. For example, the cutting edge 109 of the knife 106 is composed of a series of curves and may be employed on a tire which is not provided with an upstanding flange. The knife 107 is provided with two plane cutting faces 111 and 112 which are adapted to engage simultaneously the upper portion and the side of a tire having a flanged base band. The knife 108 is adapted to trim substantially the same type of tire as the knife 107, but instead of being provided with two plane cutting edges, it is provided with one plane cutting edge 113, similar to the edge 111, and with a rotary cutting element 114, mounted thereon through the medium of a heavy stud 115.

The rear face of the head 101 is provided with projecting portions or keys 117 which interlock with apertures formed in the sleeve 97 to hold the head in any desired position. A rod 118, secured to the rear face of the head 101, projects through the sleeve 97 and has secured thereto a collar 119, which is adapted to form a bearing face for a coiled spring 120, that also engages the sleeve 97. It is apparent that by this construction, a slight pressure exerted along the axis of the rod 118 will serve to disengage the head 101 from the sleeve 107 and permit its rotation with respect thereto, but that when the head and the sleeve are interlocked through the medium of the keys 117, the pressure exerted by the spring 120 will be sufficient to maintain the parts in the desired relation. If desired, metal bands 122 may be loosely positioned around the rods 118 and have secured thereto suitable means, such as chains 123 to hold the tools in a position in which they will be readily accessible to the operator.

In operation, air is admitted to the underside of the cylinder 33 to raise the slide 36 and also into the cylinder 81 to withdraw the member 66 to the extreme right. A vulcanized tire T is then rolled upon the rollers 12, and is so disposed thereon that the side wall is in engagement with the rollers 87, an operation which may be facilitated by employing a conventional chain hoist attached to a bar 125 positioned on the slide 36. The lever controlling the valve 83 is then operated to admit air into the right hand side of the cylinder 81 and thus force the member 66 with the rollers 77 and 78 against the side of the tire. The force exerted by the air within the cylinder 81 is sufficient to push the tire T along the rollers 12 and against the rollers 87, if it is not already in that position. The valve 49 is then manipulated to release the air pressure within the cylinder 33 and the slide 36 descends because of its own weight.

As described in detail previously, the rod 54 contacts first with the periphery of the tire and actuates the valve 59 to retard the movement of the slide 36 so that the contact of the rollers 46 with the tire does not result in shocks which would tend to injure either the machine or the tire. The motor 18 is then started by means of a conveniently disposed push button switch 126, which causes rotation of the rollers and the tire. The trimming knives 106, 107 and 108 are then pressed against the sides of the tire adjacent the flange of the rim and operate to remove the excess rubber. The thickness of the overflow is variable and, therefore, the tire could not rotate in a define plane if all of the rollers were rigidly positioned. By pivotally supporting the rollers 46 upon the slide 36 and by providing a resilient support for the rollers 77 upon the member 66, however, the parts are permitted to yield to the irregularities in the tire and hence allow its rotation in a definite plane, while at the same time maintaining a firm contact against the surface thereof. When all of the overflow has been removed by the application of any one or all of the variously formed knives, the machine is brought to rest and the slide 36 and member 66 are withdrawn by proper operation of the valves 49 and 83. The tire may then be removed from the machine for further processing.

It is apparent from the foregoing description of the construction and operation of a machine embodying the principles of the invention that there is provided an efficient and rapid means for performing the trimming operation which heretofore has been done by hand. The various structural features of the machine may be modified without departing from the spirit of the invention and likewise the various elements of the machine may be adapted with slight rearrangement for other operations. The invention should, therefore, be limited only by the scope of the following claims.

What I claim is:

1. A machine for trimming tires comprising supporting rollers upon which the tires are mounted, a carriage disposed adjacent the rollers, guide rollers secured to the carriage in position to contact with the sides of the tires, a second carriage secured adjacent to the supporting rollers, means to reciprocate the second carriage, rollers secured to the last mentioned carriage in parallel relation with respect to the supporting rollers, and means associated with the mechanism for trimming material from the tires.

2. A machine for trimming tires comprising supporting rollers upon which the tires are mounted, a carriage disposed adjacent the rollers, guide rollers secured to the carriage in position to contact with the sides of the tires, a second carriage secured adjacent to the supporting rollers, means to reciprocate the second carriage, rollers secured to the last mentioned carriage in parallel relation with respect to the supporting rollers, and means mounted upon the first mentioned carriage for removing material from tires mounted upon the supporting rollers.

3. A machine for trimming vehicle tires comprising supporting rollers, a carriage disposed adjacent the rollers, a set of guide rollers mounted upon the carriage in position to contact with the sides of the tires, a second set of guide rollers so disposed as to cooperate with the first mentioned guide rollers to support the tires upon the supporting rollers, and a trimming mechanism secured to the carriage for trimming excess material from the tires.

4. A machine for trimming vehicle tires comprising stationary supporting rollers, movable supporting rollers so disposed as to coact with the stationary rollers to maintain vehicle tires in position upon the stationary rollers, a carriage associated with both sets of supporting rollers and movable longitudinally thereof, cutting means secured to the carriage in position to contact with the sides of the tires, and means to operate the carriage.

5. A machine for trimming vehicle tires comprising means for supporting and rotating the tires, a swivelly mounted sleeve disposed adjacent the supporting means, a knife holder rotatably mounted within the sleeve, a spring actuated lock mechanism associated with the sleeve and the holder for securing the holder against rotation within the sleeve, and a trimming knife mounted in the holder in position to contact with the sides of tires.

6. A machine for trimming vehicle tires comprising means for supporting and rotating the tires, a swivelly mounted sleeve disposed adjacent the supporting means, a knife holder rotatably mounted within the sleeve, a spring actuated lock mechanism associated with the sleeve and the holder for securing the holder against rotation within the sleeve, and a plurality of trimming knives secured to the holder in position to contact with the sides of tires, each of the knives having a different edge configuration.

7. In a machine for trimming vehicle tires, means for supporting and rotating the tires, a movable knife holder associated with the supporting means, a knife secured to the holder comprising a rim contacting portion and a cutting disc mounted in a plane substantially in parallel relation with respect to said portion.

8. A machine for trimming vehicle tires comprising lower supporting rollers, a carriage associated therewith, upper supporting rollers mounted thereon in parallel relation with respect to the first mentioned rollers, means associated with the carriage for checking the rate with which the carriage approaches tires mounted upon the lower rollers, and means associated with the machine for trimming material from the tires.

9. A machine for trimming vehicle tires comprising stationary supporting rollers, a reciprocating carriage mounted for movement in a direction parallel to the rollers, guide rollers mounted upon the carriage in position to contact with the one side of a tire mounted upon the supporting rollers, a second set of guide rollers so mounted as to contact with the opposite side of the tire, a trimming knife mounted upon the carriage, means to so operate the knife as to bring it into contact with the side of a tire, a vertically movable carriage disposed above the supporting rollers, additional supporting rollers secured to the carriage in parallel relation with respect to the first mentioned supporting rollers, and pneumatic means for operating the latter carriage.

10. A machine for trimming excess material from rubber vehicle tires comprising parallel rollers for supporting and rotating the tires, certain of the rollers being radially movable with respect to the others in order closely to engage the tires supported thereby, a carriage disposed adjacent to the rollers and movable in a direction substantially parallel to the axes of the rollers, a knife holder hingedly secured to the carriage, and a knife secured to the holder in position to contact with the side portions of the tires.

11. A machine for trimming rubber vehicle tires comprising rollers movable radially with respect to each other for supporting and rotating the tires, a carriage support secured adjacent the rollers and a carriage mounted for longitudinal motion toward or away from the tires in a direction substantially parallel to the axes of the supporting rollers, a trimming knife secured to the carriage in position to contact with the sides of the tires, and means for operating the carriage.

In witness whereof, I have hereunto signed my name.

JORGEN I. HAASE.